Oct. 20, 1970   W. R. O'DONNELL   3,534,889
MEASURING TYPE LIQUID DISPENSER
Filed May 9, 1967   2 Sheets-Sheet 1

INVENTOR.
William R. O'Donnell
BY
H. Gibner Lehmann
AGENT

Oct. 20, 1970    W. R. O'DONNELL    3,534,889
MEASURING TYPE LIQUID DISPENSER
Filed May 9, 1967    2 Sheets-Sheet 2
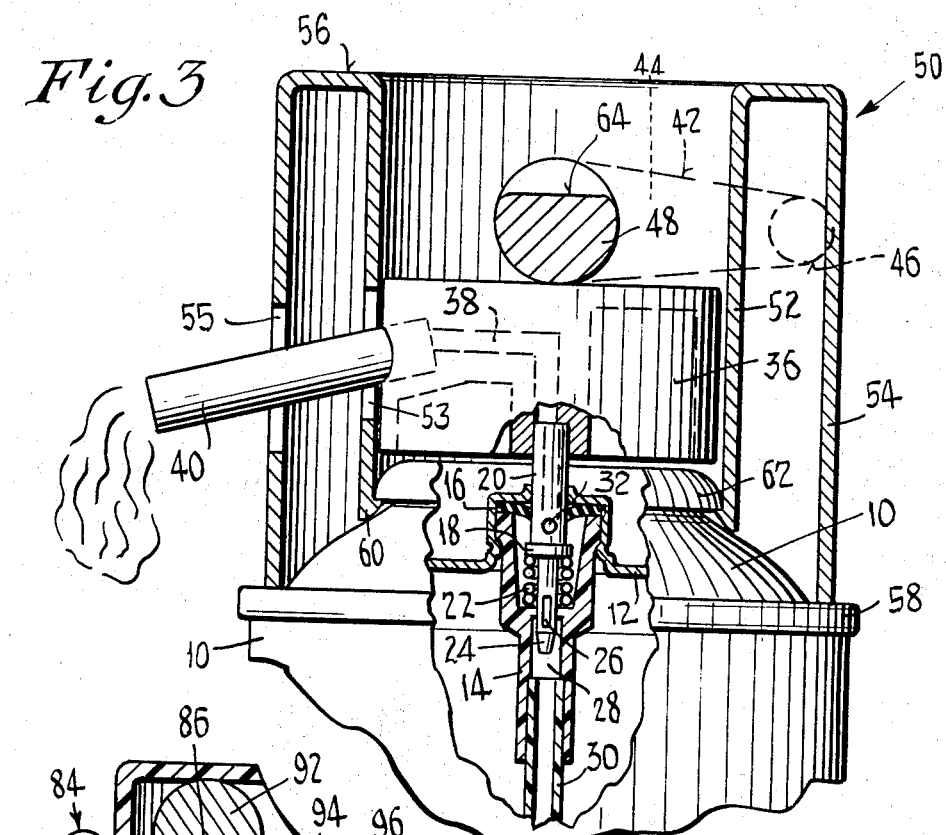
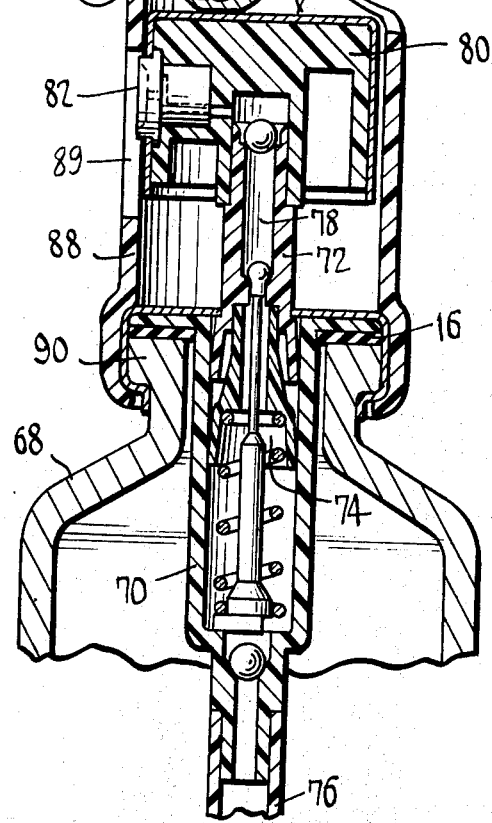
INVENTOR.
William R. O'Donnell
BY
H. Gilmer Lehmann
AGENT

United States Patent Office 3,534,889
Patented Oct. 20, 1970

3,534,889
MEASURING TYPE LIQUID DISPENSER
William R. O'Donnell, Trumbull, Conn., assignor to Valve Corporation of America, Bridgeport, Conn., a corporation of Delaware
Filed May 9, 1967, Ser. No. 637,273
Int. Cl. B65d 83/00
U.S. Cl. 222—402.13    8 Claims

ABSTRACT OF THE DISCLOSURE

A measuring-type liquid dispenser comprising a container and a discharge-controlling actuator member movably mounted on the container. A turntable finger-piece or crank is also movably mounted on the container and arranged to be manually turned through a revolution, during which it operates the actuator member to effect at least one discharge. The quantity of the discharge is roughly a function of the speed with which the crank is turned, and for average or ordinary speeds the amounts discharged for each revolution are roughly equal, and can be readily predetermined.

BACKGROUND

This invention relates to liquid dispensing devices, and more particularly to small hand-operated dispensers wherein metered or measured discharges are effected.

In prior devices of the kind referred to, a relatively small metered or measured discharge is effected by means of either a compound-type valve (commonly called a "metering valve") or else by a pump mechanism which has a predetermined capacity per stroke of the plunger. In the case of the metering valve, the container was of the pressurized type wherein the contents included a propellant such as Freon or the like. The metering-valve type device has limitations, inasmuch as the quantity discharged during any actuation is usually not very great. Moreover, under certain circumstances, especially involving improper actuation of the depress button or similar member, the metering action can be interfered with. Also, it is not possible to change the amount or quantity of the metering discharge, if the operator desires to do so.

With pump-type dispensers the amount of the discharge cannot be readily controlled, and as a practical matter the user in general will always fully depress the pump plunger each time the device is used. The resultant discharge can be greater than that desired, and there is not the possibility that a lesser discharge can be repeatedly obtained from a given cylinder and piston size, and stroke.

SUMMARY

The present invention obviates the above disadvantages of metering or measuring dispensing devices, and one object of the invention is to provide a novel and improved liquid dispenser wherein a fairly substantial quantity of the product can be dispensed for each actuation, and wherein the user has a control of the amount of discharge or quantity which is being dispensed, and can easily duplicate a desired dispensed quantity each time. This is accomplished (in conjunction with a non-metering type valve, in the case of pressurized dispensers) by providing, in addition to a basic or existing actuator member and mechanism which controls the discharge of the liquid, a supplemental or secondary actuator means or member which is mechanically coupled to the basic actuator and is so arranged that a close control (and one which is variable at the will of the user) is had of the movement of the basic actuator, thereby to enable a control to be effected of the quantity being discharged for each use of the device.

Other objects and advantages of the invention are to provide an improved measuring type secondary or supplemental actuator mechanism for either a pressurized dispenser or a pump-type dispenser, wherein relatively few parts are involved, said parts being of especially simple construction, and easily and economically fabricated and assembled; to provide an improved actuator construction as above outlined, which is simple to operate, reliable and foolproof in its functioning, and not likely to easily get out of order; to provide an improved supplemental actuator construction which enables the user to instantly vary the capacity or the discharged quantity of the product, and to duplicate said quantity time after time with a moderately good degree of accuracy; and to provide an improved supplemental actuator means which can be used with already existing dispenser structures, without requiring appreciable alteration of the same or any alteration whatsover in certain particular instances.

Other features and advantages will hereinafter appear.

In the drawings:

FIG. 3 is a view like that of FIG. 1, but showing the dispenser in the discharging condition during a portion of the operating cycle of the actuator.

FIG. 4 is an axial vertical sectional view of a pump-type dispenser having incorporated in it the supplemental measuring-type actuator means.

Figure 1:
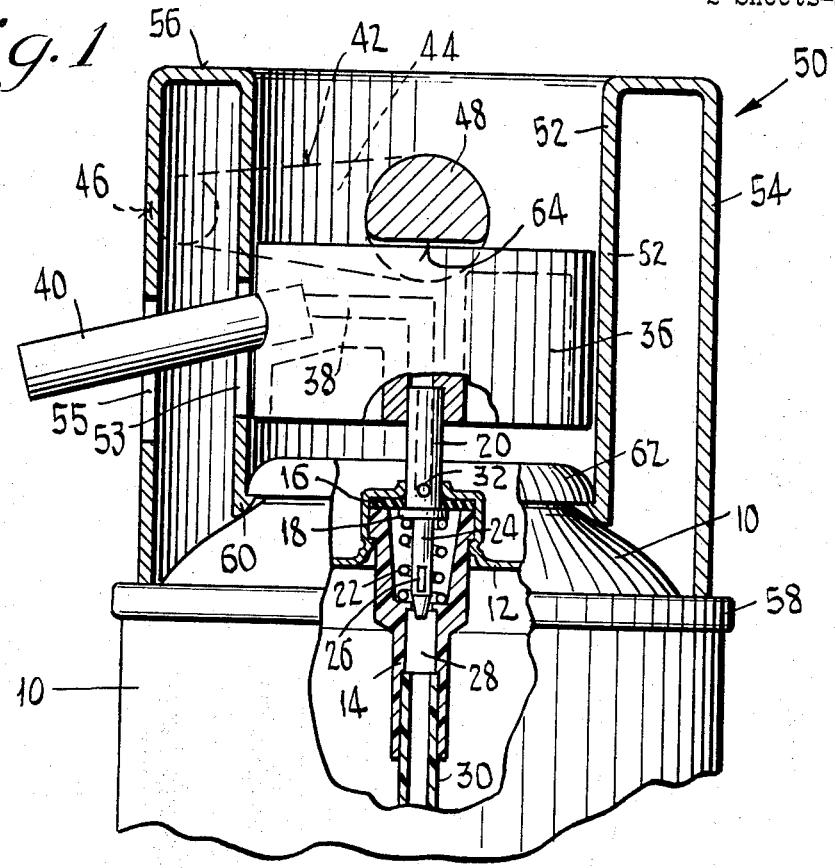
FIG. 1 is a vertical axial sectional view of a pressurized dispensing device incorporating the supplemental or measuring-type actuator construction as provided by the invention.
Figure 2:
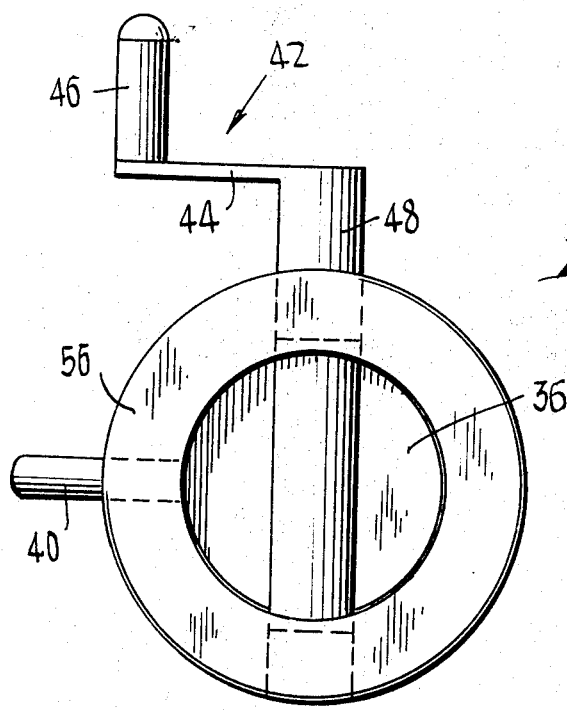
FIG. 2 is a top plan view of the dispenser shown in FIG. 1.

Referring first to FIGS. 1–3, the dispenser illustrated therein comprises a pressurized container 10 having a top closure cup 12 in which there is mounted a valve housing 14 and a flat, washer-like valve seat 16. Cooperable with the valve seat 16 is a valve shoulder 18 of a hollow valve stem 20 which is vertically movable in the housing 14 and is spring-urged to a closed position as shown in FIG. 1 by a valve return spring 22 disposed within the housing 14.

The valve stem 20 has a lower portion 24 of reduced diameter, provided with vertical grooves 26, said lower portion being guided in a reduced bore 28 of the valve housing as shown. A dip tube 30 supported by the lower portion of the valve housing 14 extends to the bottom of the container 10, constituting an inlet passage for the liquid product which is to be discharged through the housing 14.

The valve stem 20 has a side opening 32 above the shoulder 18, and when the stem 20 is depressed as illustrated in FIG. 3, the side opening 32 is below the valve seat or washer 16 whereby a continuous flow or discharge of the liquid product occurs upward through the valve stem 20, As long as the stem 20 is depressed, the said flow will occur from the container 10 through the dip tube 30, valve housing 14, side valve opening 32 and bore of the upper stem portion 20 of the valve stem.

Carried on the valve stem 20 is a depress button 36 having a discharge passage 38 leading to a nozzle 40 from which the liquid product can be discharged as illustrated in FIG. 3 when the button 36 is held depressed.

Further details of the valve construction illustrated in FIGS. 1 and 3, are given in U.S. Pat. No. 3,054,536.

In accordance with the present invention, a supplemental or secondary, manually-operable actuator device is provided in the form of a rotary finger piece which is turnably mounted on the container 10 and adapted to operate the depress button 36 in a particular fashion. The rotary finger piece, as illustrated in the figures, comprises a crank 42 having an arm 44 and a handle 46, and having a shaft 48 which passes through the side walls of a stationary cap structure 50 fixedly mounted on the can 10. The tubular cap 50 constitutes a guide for the depress button 36.

The cap construction 50 comprises a pair of inner and outer spaced concentric annular side walls 52, 54 respectively, said walls being joined together by an annular flat top wall 56. The outer wall 54 of the cap is adapted to engage the upper shoulder portion 58 of the container 10, and the inner wall 52 of the cap has at its bottom edge an internal lip 60 arranged to engage and grip a circular bead 62 of the closure cup 12.

The crank shaft 48 passes through aligned bearing holes in the side walls 52, 54 of the cap structure 50, and said shaft is provided with a flat 64 adapted to engage the depress button 36 for the position of the parts illustrated in FIG. 1. In this figure, the crank 42 is shown as being in a horizontal position, and extending forward or in the same direction as the nozzle 40. The button 36 and the valve stem 20 are in their raised non-discharging positions, and no product is flowing from the nozzle 40.

In order to effect a discharge, the user merely grasps the crank handle 46 and turns the crank through one complete revolution. In so doing, the user causes the flat 64 of the crank shaft to leave or disengage the button 36 and instead the latter will now be engaged by the cylindrical portion of the crank shaft whereby it will be depressed to the discharging position illustrated in FIG. 3. For almost the entire revolution of the crank 42 the button 36 will be depressed, resulting in a discharge of the product occurring. When the crank again returns to the starting position, the depress button 36 will be permitted to shift upward to the non-discharging position.

It will now be seen that the user has a unique and advantageous control of the movement of the button 36, and that such user can duplicate the time of depression of the button by merely repeating the turning of the crank 42 through complete revolutions at approximately the same speed. When this is done, measured amounts of product will be discharged from the nozzle 40, and the amounts in each instance will be approximately equal. If it is desired to obtain smaller measured quantities, or larger measured quantities each time, the user merely turns the crank 42 either faster or slower through the operating revolution.

Accordingly it is seen that an easy and quick control of the amount of discharge is had, and that the user may repeat a desired small or large quantity of product time after time. For example, the product which is discharged may vary from 2 cc.'s to 4 cc.'s, depending on the speed of turning of the crank, and if the crank is turned at an average speed, there will result an average discharged quantity of product of approximately 3 cc.'s per revolution of the crank.

Another embodiment of the invention is illustrated in FIG. 4, wherein the dispenser is of the pump type, involving a piston and cylinder for the purpose of effecting a discharge. Here, the action of the supplemental or secondary actuating means is in some respects different from that where the dispenser is of the pressurized container type. With the pumping type dispenser of FIG. 4, the speed of turning of the crank or secondary actuator member does not have as great an effect on the quantity being discharged, and instead the camming connection between the crank and depress button of the plunger is more directly responsible for the quantity of the discharge per revolution of the crank. If the cam is such as to cause a larger travel of the plunger, a greater quantity will be discharged, and vice versa.

As shown in FIG. 4, the container 68 has mounted on its neck portion a cylinder 70 in which there is vertically reciprocable a piston rod 72 and piston structure 74 for the purpose of effecting a pumping of liquid from a depending dip tube 76 through the bore 78 of the piston rod 72. A depress button 80 is mounted on the top of the piston rod 72, and has a discharge orifice 82 from which the product is sprayed in response to reciprocation of the piston 74 and rod 72 comprising the plunger assemblage of the pump.

Further details of the construction and operation of the pump and cylinder shown in FIG. 4, may be had by referring to U.S. Pat. No. 3,223,292.

In accordance with this invention a supplemental or secondary actuator device is provided, comprising a crank 84 carried by a crank shaft 86 passing through the side walls of a tubular stationary cap 88 which is in turn carried by the neck assemblage 90 of the container 68. On the crank shaft 86 is a cam or eccentric 92, engageable with the top surface 94 of the depress button 80. Upon the crank 84 being turned through one complete revolution, the depress button 80 and the plunger 72 together with the piston 74 will be reciprocated, effecting a pumping action by which the liquid contents of the container 68 will be discharged from the orifice 82. The tubular cap 88 constitutes a guide for the depress button 80, as will be understood.

The orifice 82 in FIG. 4 is guided in a slot 89 of the cap 88. In FIGS 1–3, the nozzle 40 extends through side openings 53 and 55 respectively in the walls 52 and 54.

In both embodiments of the invention the flat on the shaft 48 or on the eccentric 92 gives the user a tactual sensation at the completion of the operating stroke, in addition to the fact that the crank returns to the forward horizonal position.

In FIG. 4 the cap 88 is shown as having a large finger opening 96 in which the user is enabled to actuate the button 80 independently of the crank 84, if he should so desire. By using different sizes of eccentrics 92, the stroke or extent of travel of the button and plunger can be changed, thereby to change the amount of liquid product which is being discharged for each reciprocation of the plunger or revolution of the crank 84.

It will now be understood that in accordance with the invention I have provided a novel and improved measuring-type actuator construction comprising a secondary or supplemental, manually operable member which is mechanically coupled to the basic operable member or depress button of existing small liquid dispensers. The arrangement is such that measured amounts of the liquid product may be duplicated by succeeding revolutions of the crank or supplemental actuator, and the said amounts may be increased or decreased depending upon the speed of turning of the crank or the mechanical advantage between the crank and the depress button, or both. Relatively few parts are involved, said parts being of simple construction and being capable of economical fabrication and assemblage whereby the cost of the device is held to a minimum. The operation is simple, reliable, and foolproof, and the structures are not likely to malfunction or get out of order.

Variations and modifications may be made within the scope of the claims, and portions of the improvement may be used without others.

I claim:

1. A variable-discharge, measuring type pressurized liquid dispenser comprising, in combination:
    (a) a container for holding the liquid to be dispensed,
    (b) means providing a discharge passage from the container,
    (c) actuatable means including a valve and a movable valve actuator member carried by the container, controlling the outflow of liquid from the container through the said discharge passage means,
    (d) said outflow occurring continuously if the actuator member is shifted from a given non-discharging position to a discharging position, and said outflow ceasing when the actuator member is in said given non-discharging position,
    (e) spring means yieldably holding the actuator member in said given non-discharging position, (f) a rotary finger piece including a crank turnably mounted on the container for continuous turning movement through multiple complete revolutions, and (g) means for shifting said actuator member out of said given non-discharging position through said discharging position and back to the non-discharging position at least once in response to one complete revolution of said finger piece, said finger piece being at all times capable of continuous turning in at least one direction, (h) said crank comprising an arm and finger-engageable means at the end of the arm, for facilitating the manual turning of the arm through multiple revolutions.

2. A liquid dispenser as in claim 1, wherein:
(a) the container comprises a pressure vessel,
(b) said actuator means comprising a discharge valve,
(c) said actuator member comprising a hollow valve stem constituting a portion of the said discharge passage.

3. A liquid dispenser as in claim 1, wherein:
(a) the actuator means comprise a pump having a piston and cylinder,
(b) said actuator member comprising a hollow piston rod constituting a portion of the said discharge passage.

4. A liquid dispenser as in claim 1, wherein:
(a) the rotary finger piece is capable of continuous turning movement in either of opposite directions.

5. A liquid dispenser as in claim 1, wherein:
(a) a tubular cap is provided, fixedly carried by the container,
(b) said crank shaft passing through said cap and having a bearing therein.

6. A liquid dispenser as in claim 5, wherein:
(a) the tubular cap is in the shape of an inverted cup.

7. A liquid dispenser as in claim 5, wherein:
(a) the tubular cap comprises a pair of spaced, concentric annular side walls and an annular top wall joining said side walls to each other.

8. A liquid dispenser as in claim 5, wherein:
(a) the movable actuator members comprises a button guided by the cap and vertically movable therein.

References Cited

UNITED STATES PATENTS

| | | | |
|---|---|---|---|
| 2,646,192 | 7/1953 | Gronemeyer | 222—509 |
| 2,084,631 | 6/1937 | Dobyns | 222—509 X |
| 3,211,346 | 10/1965 | Meshberg | 222—402.2 |
| 3,314,577 | 4/1967 | Doblin | 222—402.14 |

FOREIGN PATENTS 78,074  4/1962  France.

STANLEY H. TOLLBERG, Primary Examiner

H. S. LANE, Assistant Examiner

U.S. Cl. X.R.

222—509; 251—258